United States Patent [19]

Chiolle et al.

[11] Patent Number: 5,106,892
[45] Date of Patent: Apr. 21, 1992

[54] ELASTOMERIC THERMOPLASTIC COPOLYETHER-ESTERS ENDOWED WITH IMPROVED THERMO-OXIDATION RESISTANCE

[75] Inventors: Antonio Chiolle; Gian P. Maltoni, both of Ferrara; Romolo Stella, Rovigo, all of Italy

[73] Assignee: Ausimont S.p.A., Milan, Italy

[21] Appl. No.: 634,664

[22] Filed: Dec. 27, 1990

[30] Foreign Application Priority Data

Dec. 29, 1989 [IT] Italy ............................... 22878 A/89

[51] Int. Cl.⁵ ............................................... C08K 5/52
[52] U.S. Cl. ................................ 524/120; 524/147
[58] Field of Search ............... 524/147, 150, 153, 120, 524/513, 119

[56] References Cited

U.S. PATENT DOCUMENTS

| | | | |
|---|---|---|---|
| 2,847,443 | 8/1958 | Hechenbleikner et al. | 524/100 |
| 3,558,554 | 1/1971 | Kuriyama et al. | 524/147 |
| 3,896,078 | 7/1975 | Hoeschele | 524/258 |
| 4,520,149 | 5/1985 | Golder | 524/120 |
| 4,520,150 | 5/1985 | Golder | 524/147 |

Primary Examiner—Paul R. Michl
Assistant Examiner—Tae H. Yoon
Attorney, Agent, or Firm—Morgan & Finnegan

[57] ABSTRACT

The thermo-oxidation resistance of the elastomeric thermoplastic copolyether-esters is remarkably improved by the addition of a synergistic mixture consisting of an organo phosphite and a pentaerythritol phosphite.

The copolymer-esters thus compounded find use in the extrusion, blow and injection molding technologies.

13 Claims, No Drawings

ELASTOMERIC THERMOPLASTIC COPOLYETHER-ESTERS ENDOWED WITH IMPROVED THERMO-OXIDATION RESISTANCE

DESCRIPTION OF THE INVENTION

The present invention relates to elastomeric thermoplastic copolyether-esters endowed with improved thermo-oxidation resistance.

More particularly, the present invention relates to elastomeric thermoplastic copolyether-esters endowed with high rheological and mechanical properties and improved resistance to the thermo-resistance, particularly suitable for being transformed into shaped articles both by extrusion blow-molding and injection molding.

The elastomeric thermoplastic copolyether-esters are materials distinguishing in the rubber field by their high physical and mechanical properties, such as toughness, fatigue resistance, abrasion resistance, impact resistance and the like, as well as by their oil and gasoline resistances.

In spite of these properties which are meaningfully higher than those of the copolyesters, the elastomeric thermoplastic copolyether-esters exhibit a poor resistance to thermo-oxidation.

It is known, in fact, that the elastomeric copolyether-esters tend to degrade when subjected to an extended exposure at temperatures higher than 150° C. This drawback drastically reduces the fields wherein the copolyether-esters may be used.

In order to overcome this drawback, it is a known tecnique to add to the copolyether-esters an antioxidant product preventing or inhibiting the heat-degradation thereof.

Many antioxidant products have been proposed for this end, but none of them allowed to solve the problem exhaustively and without undesired effects.

Thus, for example, it is known from U.S. Pat. Nos. 3,193,522 and 3,193,524 to add polycarbodiimides for improving the resistances to the thermooxidation and to the light of polyesters.

The effectiveness of these compounds, however, is somewhat limited, since the polycarbodiimides having low molecular weight are readily extracted by solvents or mineral oils, they have a tendency to migrate to the surface and result ineffective at high temperatures because they have a tendency to undergo polymerization, thereby destroying the reactivity of the carbodiimide group and thus the stabilization action of the composition.

Other carbodiimides such as, for example, those containing other functional groups, such as hydroxyl group, have been proposed as stabilizing agents; however, also these compounds tend to react with themselves, and often the activity is lost following the storability.

To overcome all the above drawbacks, it has been proposed the use, as stabilizers for polyesters, of polycarbodiimides having a molecular weight of at least 500 and having at least 3 carbodiimide groups in the molecule (see U.S. Pat. No. 3,193,522).

However, the thermo-stability of the thus obtained polyesters are not again completely satisfactory for well determined uses wherein high stabilities to thermo-oxidation are required. U.S. Pat. No. 3,896,078 proposes to improve the resistance to thermo-oxidation of the copolyetheresters by incorporating into the polymer an effective amount of amide linkage containing material, which on hydrolysis yields primary amino groups and carboxylic groups, together with an antioxidant of arylamine or hindered phenol type. A typical example of amide linkage containing compound is 1, 6-bis [3-(3,5-di-tert. butyl-4-hydroxyphenyl) propionamide] hexane, known on the market by the trade-mark IRGANOX 1098 ®.

The elastomeric thermoplastic copolyetheresters stabilized by the above compounds exhibit a poor stability toward thermo-oxidation with the time. In fact, they tend to color yellow after some days of treatment in oven at 150° C. in air. Furthermore, the physical-mechanical properties of the stabilized products rapidly decay after this treatment. The same drawbacks have been found too by using other stabilizers such as hindered phenols, amide group containing hindered phenols, phosphites and so on.

It has been now found that the resistance toward thermo-oxidative degradation of the elastomeric thermoplastic copolyether-esters may be greatly enhanced by incorporating into the polymers an effective amount of a synergistic mixture consisting of an organo phosphite and a pentaerythritol phosphite.

The amount of the stabilizing mixture to be added is generally comprised between 0.01 and 10% by weight with respect to the elastomeric copolyester, and preferably between 0.2 and 5% by weight.

The weight ratio between the organo phosphite and the pentaerythritol phosphite in the synergic system of the present invention can be varied within a large range even if ratios comprised between 1:2 and 2:1 are preferred; particularly an organo phosphite/pentaerythritol phosphite weight ratio of about 1:1.5 has been found particularly advantageous.

The organo phosphite used in the stabilizing mixture of the present invention has the general formula:

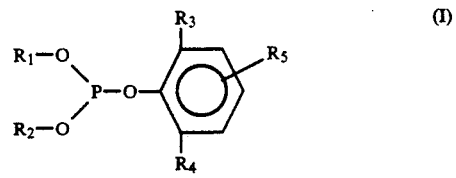

(I)

wherein:
  $R_1$ and $R_2$, which may be equal to or different from each other, represent a $C_1$–$C_6$ alkyl group, a $C_3$–$C_6$ cyclo-alkyl group, a $C_6$–$C_{12}$ aryl group, an alkyl-aryl group or an aryl-alkyl group containing from 7 to 15 carbon atoms; said groups being substituted or unsubstituted; and $R_3$, $R_4$ and $R_5$, which may be equal to or different from each other, represent hydrogen, a $C_1$–$C_6$ alkyl group, a $C_3$–$C_6$ cyclo-alkyl group, an alkyl-aryl group or an aryl-alkyl group containing from 7 to 16 carbon atoms, said groups being substituted or unsubstituted, with the proviso that at least one of $R_3$ and $R_4$ radicals be a three-dimensional hindering substituent such as a tertiary butyl group.

The organo phosphites wherein each of $R_1$ and $R_2$ radicals is

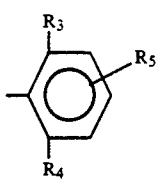 (II)

wherein R₃, R₄ and R₅ have the above-reported meanings are preferred.

Typical examples of compounds, encompassed by the above-reported formula (I) and which may be used as co-stabilizers in the synergic mixture of the present invention, are:
di-n-butyl (2-t-butyl-p-cresyl) phosphite,
di-n-hexyl (2-t-butyl-m-cresyl) phosphite,
di-n-hexyl (2-t-butyl-p-cresyl) phosphite,
di-n-octyl (2-t-butyl-p-cresyl) phosphite,
di-n-butyl-(2,4-di-t-butyl-phenyl) phosphite,
di-n-butyl (2,6-di-t-butyl-p-cresyl) phosphite,
di-phenil (2-t-butyl-p-cresyl) phosphite,
tri (2,4-di-t-butyl phenyl) phosphite,
tri (2-t-butyl-p-cresyl) phosphite,
tri (2-t-butyl-m-cresyl) phosphite,
tri (2,6-di-t-butyl-phenyl) phosphite,
tri (6-t-butyl-p-cresyl) phosphite.

These compounds are already known in the literature and proposed in U.S. Pat. No. 3,558,554 for the stabilization of polyolefins.

Particularly, the tri (2,4-di-t-butyl-phenyl) phosphite is known on the market by the trade mark ANTIOXYDANT RO 103 ® of Società Francaise D'OrganoSynthèse, IRGAFOX 168 ® of CIBA-GEIGY and AIKANOX 240 ® of Enichem Synthesis.

The pentaerythritol phosphite used in the synergistic mixture of the present invention corresponds to the general formula:

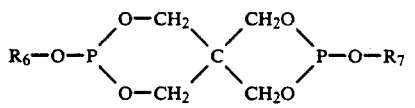 (III)

wherein R₆ and R₇, which may be equal to or different from each other, are selected from the group consisting of the following radicals: C₁-C₂₀ alkyl, aryl, ethyloxy)aryl, ethyl-oxy-alkyl, ethyl-ethoxy-oxy-aryl, ethylethoxy-oxy-alkyl and ethyl-poly-ethoxy-oxy-alkyl, each of these radicals being optionally substituted by a halogen such as Cl and F.

Examples of compounds having general formula (III) are:
di-phenyl pentaerythritol-diphosphite,
di-decyl-pentaerythritol-di-phosphite,
di-iso-decyl-pentaerythritol-di-phosphite,
di-stearyl-pentaerythritol-di-phosphite,
phenyl-iso-decyl-pentaerythritol-di-phosphite,
di-lauryl-pentaerythritol-di-phosphite,
di-methoxy-ethyl-pentaerythritol-di-phosphite,
di-toluyl-pentaerythritol-di-phosphite,
methoxyethyl-iso-decyl-pentaerythritol-di-phosphite,
di-ethoxy-ethyl-pentaerythritol-di-phosphite,
di-butoxy-ethyl-pentaerythritol-di-phosphite, methoxyethyl-butoxy-ethyl-pentaerythritol-di-phosphite,
di-methoxy-ethoxy-ethyl-pentaerythritol-di-phosphite,
di-butoxy-ethoxy-ethyl-pentaerythritol-di-phosphite,
di-methoxy-polyethoxyethyl-pentaerythritol-di-phosphite, the polyethoxyethyl group of which has an average molecular weight of 550.

All the above compounds and their preparation are well known in literature and disclosed in U.S. Pat. Nos. 2,847,443; 3,047,608 and 3,205,269, the content of which is integral part of the present description.

A particularly preferred compound is di-stearylpentaerythritol-di-phosphite or 3,9-di (octadecyloxy) 2, 4, 8, 10-tetraoxa-3,9-diphosphaspiro [5,5]-undecane, known in the market with the trade mark WESTON 618 ® produced and traded by Soc. WESTON CHEMICAL Inc. and ULTRANOX 624 ® of BORG WARNER CHEMICALS.

Any elastomeric thermoplastic copolyether-ester containing ester bonds

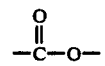

and ether bonds —C—O—C may be stabilized by the synergistic mixtures of the present invention, provided that said polyether-esters exhibit a softening or melting temperature lower than 250° C., which is the temperature at which the stabilizing system is no more effective.

The elastomeric thermoplastic copolyether-esters having a segmented structure are, however, particularly preferred. These elastomeric thermoplastic copolyetheresters consist of a multiplicity of repeating long-chain ester units and of repeating short-chain ester units connected to each other head-to-tail through linkages of the ester type. Said long-chain ester units are represented by the formula:

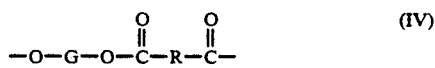 (IV)

and said short-chain units are represented by the formula:

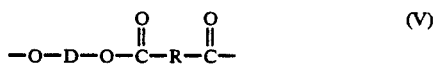 (V)

wherein:
G is a divalent radical remaining after the removal of the hydroxyl end groups from a poly-(alkylene oxide) glycols having a molecular weight comprised between about 250 and 6,000 and a carbon-/oxygen ratio of about 1.8-4.3;
R is a divalent radical remaining after the removal of the carboxyl groups from a dicarboxylic acid having a molecular weight lower than about 300; and
D is a divalent radical remaining after the removal of hydroxyl groups from a diol having a molecular weight lower than about 250.

In said copolyesters the short-chain ester units having the above formula (V) are in an amount of about 15-95% by weight, and preferably 33-86% by weight, with respect to the weight of the copolyester the remaining part being constituted by long-chain ester having the above formula (IV).

Said elastomeric copolyether-esters are well known in the literature, for example, by U.S. Pat. Nos. 3,023,192 and 3,651,015; Italian Patent Nos. 947589, 963,304, 973,059 and by Italian patent application No.

21, 212 filed on July 4, 1988 in the name of the Same Applicant.

The expression "long-chain ester chains" relates to the reaction product of a poly(alkylenoxide) glycol with a dicarboxylic acid, in order to form ester units represented by the above formula (IV).

As poly(alkylenoxide) glycols may be used those containing from 2 to 10 carbon atoms in the alkylene radical, such as poly-(1,2- and 1,3-propylene-oxide)-glycol; poly-(tetramethylene-oxide)-glycol; poly-(pentathylene-oxide)-glycol; poly-(hexamethylene-oxide)-glycol; poly-(heptamethylene-oxide)-glycol; poly-(octamethylene-oxide)-glycol; poly-(nonamethylene-oxide)-glycol; poly-(decamethylene-oxide)-glycol; and poly-(1,2-butylene-oxide)-glycol; polybutene-1-polybutadiene OH terminated; random copolymers or block copolymers of ethylene-oxide and 1,2-propylene-oxide; and the like.

Particularly preferred is poly-(tetramethylene-oxide)-glycol having a very narrow average distribution of the molecular weights, such as, for example, a Mw/Mn ratio lower than 2, which generally exhibits an improved resistance to the fluids such as oils, gasoline, water, fats and so on.

The expression "short-chain ester units" relates to the product of reaction of a diol having a low molecular weight (lower than about 250) with a dicarboxylic acid in order to form ester units represented by the formula (V) above reported.

Among the diols having a low molecular weight which react to form short-chain ester chains, non-cyclic, alicyclic and aromatic di-hydroxy compounds are included. Diols of from 2 to 15 carbon atoms such as ethylene-glycol, propylene-glycol, isobutylene-glycol, tetramethylene-glycol, pentamethylene-glycol, 2,2-dimethyltrimethylene-glycol, hexamethylene-glycol and decamethylene-glycol, di-hydroxycyclohexane, cyclohexanedimethanol, resorcinol, hydroquinone, 1,5-di-hydroxynaphthalene, and so forth, are preferred.

Particularly preferred are aliphatic diols containing from 2 to 8 carbon atoms.

Examples of di-hydroxy-aromatic compounds which may be used are bisphenols, such as bis-(p-hydroxy)-diphenyl, bis-(p-hydroxyphenyl)-methane, and bis-(p-hydroxyphenyl)-propane.

The term "low-molecular-weight diols" as used herein should hence be understood as including all of the derivatives suitable for forming esters, provided that the molecular weight requirement is only referred to the diol, and not to the derivatives thereof.

However, 1,4-butane-diol is particularly preferred for the purpose of the present invention.

Dicarboxylic acids which are reacted with the above poly(alkylenoxide) glycols and with the low molecular weight diols to produce the copolyether-esters of the present invention are aliphatic, cycloaliphatic or aromatic dicarboxylic acids having a low molecular weight, i.e., having a molecular weight of less than about 300. The term "dicarboxylic acids" includes also equivalent derivatives of dicarboxylic acids which perform substantially like the dicarboxylic acids in reaction with glycols and diols in forming the copolyether-ester polymers. These equivalent compounds include esters and ester-forming derivatives, such as, e.g., acid halides and anhydrides. The molecular weight requirement pertains to the acid, and not to its ester equivalent, or to its ester-forming derivatives.

Therefore, within the definition of "dicarboxylic acid" also an ester of a dicarboxylic acid having a molecular weight greater than 300, or a dicarboxylic acid equivalent having a molecular weight greater than 300 are included, provided that the corresponding acid has a molecular weight below about 300. The dicarboxylic acids can contain any substituent groups or any combination of substituent groups which do not substantially interfere with the formation of the copolyester polymer and with the use of the polymer in the end products according to the present invention.

Within the context of the present invention, by aliphatic dicarboxylic acids, those carboxylic acids are meant that contain two carboxylic groups, each attached to a saturated carbon atom. If the carbon atom to which the carboxylic group is attached is a saturated one and is located in a ring, the acid is cycloaliphatic. Generally, the aliphatic acids or the cycloaliphatic acids containing a conjugated unsaturation cannot be used, in that they are liable to homopolymerize. However, some unsaturated acids, such as, e.g., maleic acid the dimer or trimer of the oleic acid can be used.

The aromatic dicarboxylic acids, according to the expression used in the instant context, refer to dicarboxylic acids having two carboxylic groups, each carboxylic group being attached to a carbon atom in an isolated or fused benzene ring. It is not necessary that both functional carboxylic groups be attached to the same aromatic ring, and, where more than one ring is present, they may be joined by aliphatic or aromatic divalent radicals, or by divalent radicals such as, e.g., —O— or —SO$_2$—, or even by a simple bond.

Examples of aliphatic and cycloaliphatic dicarboxylic acids which can be used according to the present invention are sebacic acid, 1,3-cyclohexane-dicarboxylic acid, 1,4-cyclohexane-dicarboxylic acid, adipic acid, glutaric acid, succinic acid, oxalic acid, azelaic acid, diethyl-malonic acid, allyl-malonic acid, 4-cyclohexane-1,2-dicarboxylic acid, 2-ethyl-suberic acid, 2,2,3,3-tetramethyl-succinic acid, cyclopentane-dicarboxylic acid, decahydro-1,5-naphthalene-dicarboxylic acid, 4,4'-dicyclohexyl-dicarboxylic acid, decahydro-2,6-naphthalene-dicarboxylic acid, 4,4'-methylene-bis-(cyclohexyl)-carboxylic acid, 3,4-furane-dicarboxylic acid, 1,1-cyclobutane-dicarboxylic acid, and so forth.

Cyclohexane-dicarboxylic acid and adipic acid are preferred dicarboxylic acids.

Examples of aromatic dicarboxylic acids which can be used comprise phthalic acid, isophthalic acid and terephthalic acid, dibenzoic acid, dicarboxylic compounds substituted with two benzene rings, such as, e.g., bis-(paracarboxyl-phenyl)-methane, para-oxy-(para-carboxyl-phenyl)-benzoic acid, ethylene-bis- (para-oxy-benzoic acid), 1,5-naphthalene-dicarboxylic acid, 2,6-naphthalene-dicarboxylic acid, 2,7-naphthalene-dicarboxylic acid, phenanthrene-dicarboxylic acid, anthracene-dicarboxylic acid, 4,4'-sulfonyl-dibenzoic acid, tio-phurane-3,4-dicarboxylic acid, and their $C_1$–$C_{12}$-alkyl derivatives and derivatives resulting from substitution on the ring, such as, e.g., halo, alkoxy, and aryl derivatives.

Aromatic acids containing a hydroxyl group, such as, e.g., para-($\beta$-hydroxyl-ethoxy) benzoic acid, may also be used, provided that an aromatic dicarboxylic acid is also present.

The aromatic dicarboxylic acids constitute a preferred class for preparing the copolyether-ester polymers of the present invention.

Among the aromatic acids, those with from 8 to 16 carbon atoms are preferred, particularly preferred are phenylene-dicarboxylic acids, i.e., phthalic acid, isophthalic acid and terephthalic acid. In particular, either terephthalic acid alone or a mixture of terephthalic acid and isophthalic acid are preferred.

At least about 70% by mol of the dicarboxylic acid included in the polymer should preferably be constituted by terephthalic acid, i.e., about 70% of the "R" groups in the formulae (IV) and (V) above, are preferably 1,4-phenylene radicals.

The carboxylic acids or their derivatives and the polymeric glycols are included in the end product in the same molar proportions in which they are contained in the reaction mixture. The actually included amount of low-molecular weight diol corresponds to the difference between the mols of diacid and the mols of polymeric glycol contained in the reaction mixture.

The most preferred copolyesters of the present invention are those prepared from terephthalic acid (TPA), 1,4-butanediol (BD), and poly-tetramethylene-glycol (PTMG) having a molecular weight comprised between 250 and 4,500 and optionally isophthalic acid (IPA) in an amount not greater than 5% by weight with respect to the total amount of the two acids.

The polymers of the present invention may be suitably prepared by means of a normal transesterification reaction. A preferred process consists in heating at 150°–230° C., the ester of the dicarboxylic acid, for example the dimethyl ester of terephthalic acid with the poly(alkylene oxide) glycol and a molar excess of a diol, in the presence of a catalyst. The amount of the diol is at least 1.1 of diol for each mole of acid.

The heating is continued until the removal of methanol is essentially complete.

The resulting prepolymer is then carried to high molecular weight by distillation of the excess of the low molecular weight diol (polycondensation). During this distillation, additional transesterification occurs, which leads to an increase in molecular weight and to a random arrangement of the various copolyster units in the molecule.

In order to avoid an excessively long hold time of the polymer at high temperatures with possible irreversible thermal degradation, catalysts for the ester interchange reaction are advantageously employed. While a wide variety of catalysts can be employed, organic titanates, such as, e.g., tetrabutyl titanate, either alone or in combination with magnesium or calcium acetates, are preferred. Complex titanates derived from alkali or alkaline earth metal alkoxides and esters of titanic acid, are also very effective. Inorganic titanates, such as lanthanium titanate, mixtures of calcium acetate and antimony dioxide, and lithium and magnesium alkoxides are further examples of catalysts which can be used.

The ester interchange polymerizations are generally carried out in the molten state, but inert solvents can also be used to facilitate the removal of volatile components from the mass by operating at lower temperatures.

During the preparation of the elastomeric thermoplastic copolyester-ester it is conventional tecnique to add a stabilizer in order to prevent an oxidative degradation of the reagents and of the polymer during its formation. The known phenolic stabilizers can be used for this purpose.

The synergistic mixture of organo phosphite having formula (I) and pentaerythritol phosphite of formula (III) may be added to the copolyether-ester either during the polycondensation reaction either at the end of this reaction when the copolyester is again in the melt state, or after this reaction in a separate step by re-melting the coplyester in an extruder.

The synergistic mixture may be added in the form of a solid, a liquid in the melt state or in solution or dispersion into one or more of the reagents. It is generally suitable to add the synergistic mixture in the solid form to the finished copolyester by melt blending.

In this case, it is possible to prepare a master batch of the stabilizer, for example having an amount of synergistic mixture of 20–40% by weight, and then to dilute this master batch with the pure copolyether ester. This blending is carried out in an extruder at a temperature comprised between 150°–280° C., depending on the particular type of copolyether-ester; the extruder may be of mono-screw or bi-screw type, preferably equipped with venting, or a Banbury.

The copolyether-esters stabilized by the synergistic mixture of the present invention exhibit a high resistance to the thermo-oxidation.

Owing to these peculiar properties, the stabilized copolyether-esters of the present invention find use for producing hydraulic pipes, coatings for cables, elastic supports for bumpers, bellows for covering joints or couplings, composite gaskets or, generally, shaped articles to be used at high working temperatures, generally higher than 120° C.

The characteristics of the copolyether-esters of the present invention may be further modified by the introduction of various conventional inorganic fillers, such as, e.g., carbon black, silica gel, alumina, clay, fiberglass, and so forth. In general, the effect of these additives is to increase the modulus of the material, but to the detriment of the elongation, the tearing strength and abrasion resistance.

Besides the above, the product may be rendered flameproof. (ul 94 Class: V2, V0, etc.) by the addition of various flame-proofing systems containing aromatic halides, aliphatic halides or not containing halogens, in amounts ranging from 15 to 45% by weight, referred to the end product.

EXAMPLES

In order to make the present invention still better understood, some examples are reported below which are of a merely illustrative character, and no way are limitative of the invention.

All parts, proportions and parameters reported in the following are by weight, unless differently specified.

EXAMPLES 1–5

Dimethyl-terephthalate, optionally isophthalic acid, 1,4-butene-diol, polytetra-(methylene)-glycol (PTMG), having different molecular weight, were charged into autoclave equipped with a distillation column, variable-speed stirring means and a temperature control system, in the amounts listed in Table I.

The temperature was gradually increased up to 140°–150° C. over about 1 hour, and 150 ppm of Ti(OBu)$_4$ previously dissolved in a few ml of butane diol (about 10–20 cm$^3$), was added. After a short induction time, the reaction of transesterification started; this reaction was evidenced by an increase in column overhead of the temperature to about 65°–70° C., which demonstrated the removal of methanol. The temperature of the reaction mass was gradually increased up to 205° C. (during a 2 hour time) and was kept constant at this value until the termination of the methanol distillation.

150 ppm of catalyst (tetrabutyl titanate) and about 4,000 ppm of phenolic stabilizer, Irganox 1010 produced and marked by CIBA GEIGY were added and vacuum was gradually applied until a residual pressure of about 0.05 mm Hg was reached, within a time of about 30 minutes, and heating was continued until an internal temperature of about 250° C. was reached.

When the product reached the desired Melt Index, about 10-25 g/10′, at 230° C. and 2.16 Kg, the polymer was discharged by extrusion onto a water-cooled conveyor belt, and was chopped into small cubic granules.

The properties of the obtained copolyesters are listed in Table I.

TABLE I

| Monomers | Method | Units | EXAMPLES | | | | |
|---|---|---|---|---|---|---|---|
| | | | 1 | 2 | 3 | 4 | 5 |
| Dimethylterephthalate | | | 455 | 498 | 644 | 613 | 786 |
| Isophthalic acid | | | | | | 23 | |
| 1,4 butenediol | | | 212 | 244.6 | 353 | 224 | 396 |
| PTMG having molec. weight 250 | | | | | | 263 | 167 |
| PTMG having molec. weight 650 | | | | | | 117 | |
| PTMG having molec. weight 1,000 | | | 530 | 477.8 | 296 | — | |
| PROPERTIES | | | | | | | |
| Melting point | D 2117 | °C. | 182 | 191 | 209 | 160.5 | 198 |
| Glass transition temperature | DIN 53445 | °C. | −60 | −50 | −12 | −41 | +30 |
| Melt Index at 230° C. and 2.16 Kg. | D 1238 | g/10′ | 20 | 18 | 18 | 21 | 13 |

EXAMPLE 6

The elastomeric thermoplastic copolyether-ester of example 2 was mixed at 200° C. in a doublescrew extruder MARIS M33 type with 0.5% by weight of IRGAFOX 168 ®, 0.5% by weight of WESTON 618 ® and 0.5% by weight of a mixture constituted by IRGAFOX 168 ® ESTON 618 ®, in the weight ration 1:1.5, respectively.

The thus stabilized products was injection molded at about 200° C. and the tensile strength and the elongation at break properties were measured, according to the ASTM D 638 method.

The obtained values are listed in following Table II.

TABLE II

| COPOLYETHER-ESTER of Example 2 | PURE PRODUCT | Stabilized with IRGAFOX 168 ® | Stabilized with WESTON 618 ® | Stabilized with a mixture IRGAFOX 168 ® + WESTON 618 ® in the ratio 1:1.5 |
|---|---|---|---|---|
| PROPERTIES | | | | |
| Tensile strength (MPa) | 23 | 23 | 23 | 24 |
| Elongation at break (%) | 800 | 800 | 800 | 810 |
| RESISTANCE TO THE THERMO-OXIDATION at 150° C. | | | | |
| AFTER 4 DAYS | | | | |
| Tensile strength (MPa) | N.D.* | N.D.* | 14.4 | 21 |
| Elongation at break (%) | N.D.* | N.D.* | 600 | 370 |
| AFTER 14 DAYS | | | | |
| Tensile strength (MPa) | N.D.* | N.D.* | 8.3 | 13 |
| Elongation at break (%) | N.D.* | N.D.* | 90 | 210 |

*N.D. = Not determinable owing to the degradation of the product.

EXAMPLES 7-10

By operating according to the process conditions of example 6, stabilized compositions constituted by the copolyether-esters of examples 1, 3, and 5 and 0.5% of a mixture IRGAFOX 168 ® and WESTON 618 ®, in the weight ration 1:1,5, were prepared.

The properties of the stabilized compositions thus obtained are listed in the following Table III.

The tensile strength and the elongation were measured according to ASTM D 638 method.

TABLE III

| COPOLYETHER-ESTER OF EXAMPLE PROPERTIES | 1 PURE PRODUCT | 1 STAB-ILIZED | 3 PURE PRODUCT | 3 STAB-ILIZED | 4 PURE PRODUCT | 4 STAB-ILIZED | 5 PURE PRODUCT | 5 STAB-ILIZED |
|---|---|---|---|---|---|---|---|---|
| Tensile strength (MPa) | 19 | 20 | 33 | 33 | 24 | 24 | 35 | 35 |
| Break elongation (%) | 800 | 850 | 700 | 720 | 690 | 760 | 400 | 450 |
| RESISTANCE TO THE THERMO-OXIDATION at 121° C. | | | | | | | | |
| AFTER 7 DAYS | | | | | | | | |
| Tensile strength (MPa) | 15 | 18 | 30 | 30 | 20 | 22 | 31 | 34 |
| Break elongation (%) | 750 | 750 | 500 | 650 | 600 | 760 | 370 | 420 |
| AFTER 30 DAYS | | | | | | | | |
| Tensile strength (MPa) | 11 | 15 | 23 | 28 | 15 | 19 | 22 | 30 |
| Break elongation (%) | 320 | 700 | 350 | 600 | 500 | 730 | 200 | 380 |
| AFTER 50 DAYS | | | | | | | | |
| Tensile strength (MPa) | 10 | 14 | 16 | 26 | 12 | 18 | 19 | 27 |
| Break elongation (%) break (%) | 130 | 600 | 150 | 550 | 85 | 700 | 70 | 320 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims. The above references are hereby incorporated by reference.

We claim:

1. Elastomeric thermoplastic copolyetheresters endowed with improved thermo-oxidation resistance, comprising an effective amount of a stabilizing system constituted by a synergistic mixture of an organo phosphite and of a pentaerythritol phosphite, the organo phosphite has formula:

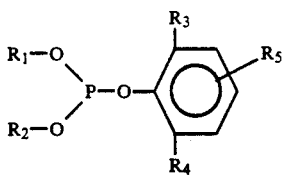 (I)

wherein:

$R_1$ and $R_2$, which may be equal to or different from each other, represent a $C_1$-$C_6$ alkyl group, a $C_3$-$C_6$ cyclo-alkyl group, a $C_6$-$C_{12}$ aryl group, an alkyl-aryl group or an aryl-alkyl group containing from 7 to 15 carbon atoms; said groups being substituted or unsubstituted; and $R_3$, $R_4$ and $R_5$, which may be equal to or different from each other, represent hydrogen, a $C_1$-$C_6$ alkyl group, a $C_3$-$C_6$ cyclo-alkyl group, an alkyl-aryl group or an aryl-alkyl group containing from 7 to 16 carbon atoms, said groups being substituted or unsubstituted, with the proviso that at least one of $R_3$ and $R_4$ radicals be a three-dimensional hindering substituent, and the pentaerythritol phosphite has the formula:

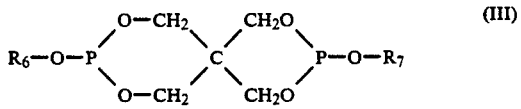 (III)

wherein $R_6$ and $R_7$, which may be equal to or different from each other, are selected from the group consisting of the following radicals: $C_1$-$C_{20}$ alkyl, aryl, ethyl-oxy-aryl, ethyl-oxy-alkyl, ethyl-ethoxy-oxy-aryl, ethyl-ethoxy-oxy-alkyl and ethyl-poly-ethoxy-oxy-alkyl, each of these radicals being optionally substituted by a halogen.

2. Elastomeric thermoplastic copolyether-esters according to claim 1, wherein at least one of $R_3$ and $R_4$ radicals is a ter butyl group.

3. Elastomeric thermoplastic copolyether-esters according to claim 1, wherein each of $R_1$ and $R_2$ radicals is

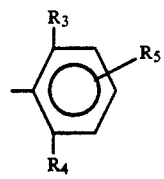 (II)

wherein $R_3$, $R_4$ and $R_5$ have the meanings of claim 2.

4. Elastomeric thermoplastic copolyether-esters according to claim 1, wherein the organo phosphite is tri(2,4-di-t-butyl-phenyl) phosphite.

5. Elastomeric thermoplastic copolyether-esters according to claim 1, wherein the pentaerythritol phosphite is 3,9-di(octadecyloxy) 2,4,8,10-tetraoxa-3,9-diphosphaspiro [5,5]-undecane.

6. Elastomeric thermoplastic copolyether-esters according to claim 1, wherein the amount of the stabilizing system is between 0.01 and 10% by weight with respect to the elastomeric copolyether-ester.

7. Elastomeric thermoplastic copolyether-esters according to claim 1, wherein the weight ratio between the organo phosphite and the pentaerythritol phosphite is between 1:2 and 2:1.

8. Elastomeric thermoplastic copolyether-esters according to claim 7, wherein the weight ratio between the organo phosphite and the pentaerythritol phosphite is 1:1.5.

9. Elastomeric thermoplastic copolyether-esters according to claim 1, wherein said copolyether-ester consists of a multiplicity of repeating long-chain ester units and of short-chain ester units joined to each other by head-to-tail connections through ester bonds; the long-chain ester units being represented by the formula:

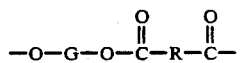 (IV)

and the short chain units being represented by the formula:

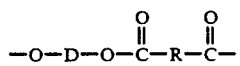 (V)

wherein:
G is a divalent radical remaining after the removal of the end hydroxyl groups from a poly-(alkylene oxide)glycol having a molecular weight between approximately 250 and 6,000 and a carbon/oxygen ratio of approximately 1.8–4.3;

R is a divalent radical remaining after the removal of the carboxyl groups from a dicarboxy acid having a molecular weight lower than about 300; and D is a divalent radical remaining after the removal of hydroxyl groups from a diol having a molecular weight lower than about 250, and wherein the short chain ester corresponding to the above formula (V) are in an amount of about 15–95% by weight, with respect to the weight of the copolyester, the remaining part being constituted by long-chain ester units corresponding to the formula (IV).

10. Elastomeric thermoplastic copolyether-esters according to claim 1, further comprising from 5 to 45% by weight of a flame-proofing agent selected from the aromatic halides, aliphatic halides and the synergistic flame-proof systems not containing halogens.

11. Elastomeric thermoplastic copolyether-esters according to claim 1, wherein the halogen is Cl or F.

12. Elastomeric thermoplastic copolyether-esters according to claim 6, wherein the amount of the stabilizing system is between 0.2 and 5% by weight.

13. Elastomeric thermoplastic copolyether-esters according to claim 9, wherein the short chain ester corresponding to formula (V) is in an amount of about 33–86% by weight.

* * * * *